(12) United States Patent
Nakagawa

(10) Patent No.: US 7,997,806 B2
(45) Date of Patent: Aug. 16, 2011

(54) OPTICAL FIBER CONNECTOR

(75) Inventor: Masaya Nakagawa, Kyoto-fu (JP)

(73) Assignee: Suncall Corporation, Kyoto-fu (JP)

( * ) Notice: Subject to any disclaimer, the term of this patent is extended or adjusted under 35 U.S.C. 154(b) by 332 days.

(21) Appl. No.: 12/372,991

(22) Filed: Feb. 18, 2009

(65) Prior Publication Data

US 2009/0214164 A1 Aug. 27, 2009

(30) Foreign Application Priority Data

Feb. 21, 2008 (JP) ................................. 2008-039901

(51) Int. Cl.
*G02B 6/36* (2006.01)

(52) U.S. Cl. ........................................... 385/78; 385/84

(58) Field of Classification Search ............... 385/78–87
See application file for complete search history.

(56) References Cited

FOREIGN PATENT DOCUMENTS

JP 2005-091379 7/2005

*Primary Examiner* — Kevin S Wood

(74) *Attorney, Agent, or Firm* — Sterne, Kessler, Goldstein & Fox P.L.L.C.

(57) ABSTRACT

An optical fiber connector includes a housing, a ferrule, a bias member and a flexible tube. The ferrule is formed with a first axial hole of a first inner diameter larger than an outer diameter of a jacket of an optical fiber and a second axial hole that is communicated to a distal end of the first axial hole and that has a second inner diameter smaller than the first inner diameter and larger than an outer diameter of a fiber wire of the optical fiber. The flexible tube is inserted around the proximal end side of the ferrule so that at least a part thereof is extended toward the proximal end side than the ferrule to form a proximal-end-side extended part. The proximal-end-side extended part has an inner diameter larger than the outer diameter of the jacket and smaller than the first inner diameter.

4 Claims, 5 Drawing Sheets

OPTICAL FIBER CONNECTOR

BACKGROUND OF THE INVENTION

1. Field of the Invention

The present invention relates to an optical fiber connector mounted to an end part of an optical fiber.

2. Related Art

Conventionally, there has been widely used an optical fiber connector that optically connects a first optical fiber with a second optical fiber (refer to, for example, Japanese Unexamined Patent Publication No. 2005-091379).

The optical fiber includes a fiber wire and a jacket that surrounds the fiber wire, and has on a distal end side thereof a cladding part where the fiber wire is exposed.

The optical fiber connector is attached to the distal end side of the optical fiber.

More specifically, the optical fiber connector includes a housing that is detachably coupled to an adapter, a rigid ferrule that is accommodated in the housing in a movable manner along an axial line direction with a distal end thereof being extended outwards from the housing, the ferrule being formed on a proximal end side thereof with a first axial hole having a first inner diameter which is larger than the outer diameter of the jacket and on the distal end side with a second axial hole being communicated to a distal end of the first axial hole and having a second inner diameter which is smaller than the first inner diameter and is larger than the outer diameter of the fiber wire, and a bias member that biases the ferrule toward the distal end side within the housing.

The optical fiber connector is fixed to the optical fiber with use of an adhesive agent filled in the first axial hole in a state where the fiber wire of the cladding part is inserted into the second axial hole and a portion (hereinafter, referred to as a fixed region) of the optical fiber which is surrounded by the jacket and which is adjacent to a proximal end of the cladding part is inserted into the first axial hole.

Although the optical fiber connector is useful in facilitating optical connection between the first optical fiber and the second optical fiber in cooperation with the adapter, it has, on the other hand, room to improve in terms of adhesion between the optical fiber and the ferrule.

Specifically, the first axial hole functions as a guide that leads the fiber wire of the cladding part so as to be inserted into the second axial hole, as well as functions as an adhesive agent filled region that receives the adhesive agent with the fixed region being inserted therein.

In a case where the inner diameter of the first axial hole is set as approximately equal as possible to the outer diameter of the jacket while allowing the fixed region to be inserted into the first axial hole, the first axial hole can effectively function as the guide. However, at the same time, it becomes difficult to evenly fill the adhesive agent around the fixed region and to fill the adhesive agent into the distal end of the first axial hole. Thus, in some cases, the optical fiber and the ferrule may not be solidly fixed with each other.

To the contrary, in a case where the inner diameter of the first axial hole is made extremely larger than the outer diameter of the jacket, the adhesive agent can be easily filled in. However, at the same time, decreased is the function of the first axial hole as the guide. Furthermore, if the inner diameter of the first axial hole is made too large, the axial position of the fixed region may be displaced with respect to the axial position of the second axial hole when the adhesive agent is being filled in or being solidified. When the fixed region is axially displaced, the boundary between the cladding part and the fixed region is applied with a stress in a direction different from the axial direction of the optical fiber. In some cases, the fiber wire may be deformed by such a stress.

SUMMARY OF THE INVENTION

The present invention is made in view of the conventional techniques and aims to provide an optical fiber connector capable of bonding an optical fiber to a ferrule while preventing displacement therebetween.

The present invention provides, in order to achieve the aim an optical fiber connector attached to a distal end side of an optical fiber that includes a fiber wire and a jacket surrounding the fiber wire and that has, on the distal end side, a cladding part where the fiber wire is exposed, the optical fiber connector including a housing detachably coupled to an adaptor, a rigid ferrule accommodated in the housing in a movable manner along an axis line direction, the ferrule having a distal end extended outwards from the housing, the ferrule having a proximal end side with a first axial hole that has a first inner diameter larger than an outer diameter of the jacket and a distal end side with a second axial hole that is communicated to a distal end of the first axial hole and that has a second inner diameter smaller than the first inner diameter and larger than an outer diameter of the fiber wire, a bias member that biases the ferrule toward the distal end side of the optical fiber within the housing, and a flexible tube inserted around the proximal end side of the ferrule so that at least a part thereof is extended toward the proximal end side from the ferrule to form a proximal-end-side extended part.

The proximal-end-side extended part of the flexible tube has an inner diameter that is larger than the outer diameter of the jacket and that is smaller than the first inner diameter.

The thus configured optical fiber connector according to the present invention makes it possible to effectively align an axial position of the optical fiber with an axial position of the ferrule without necessity of making the inner diameter of the first axial hole of the ferrule come close to the outer diameter of the jacket. Furthermore, the optical fiber connector could enhance workability while filling an adhesive agent for bonding the optical fiber to the ferrule because the adhesive agent is filled into the first axial hole through the flexible tube.

The flexible tube may be preferably formed by a hollow member having thermal contractility.

The preferable configuration makes it possible to easily making the inner diameter of the proximal-end-side extended part smaller than that of the first axial hole while easily performing insertion of the flexible tube around the ferrule.

In one embodiment, the first inner diameter is set to a diameter (for example, 0.95 mm-1.05 mm) that allows an optical fiber having an outer diameter of 0.9 mm to be inserted therein, and the proximal-end-side extended part of the flexible tube has an inner diameter (for example, 0.3 mm-0.5 mm) that prevents the optical fiber having an outer diameter of 0.9 mm from being inserted therein while allowing an optical fiber having an outer diameter of 0.25 mm to be inserted therein.

The configuration makes it possible to commonly employ the ferrule, the housing and the bias member to both of one optical fiber having an outer diameter of 0.9 mm and the other optical fiber having an outer diameter of 0.25 mm while realizing the above-mentioned effects.

In any one of the above-explained various configurations, the proximal-end-side extended part of the flexible tube preferably has an end that is located away from the ferrule and that is extended outwards from the housing.

The preferable configuration makes it possible to effectively prevent the optical fiber from being brought into contact with the housing, thereby effectively preventing deformation of the optical fiber.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

Below described with reference to the accompanying drawings is an optical fiber connector according to a preferred embodiment of the present invention.

Figure 1:
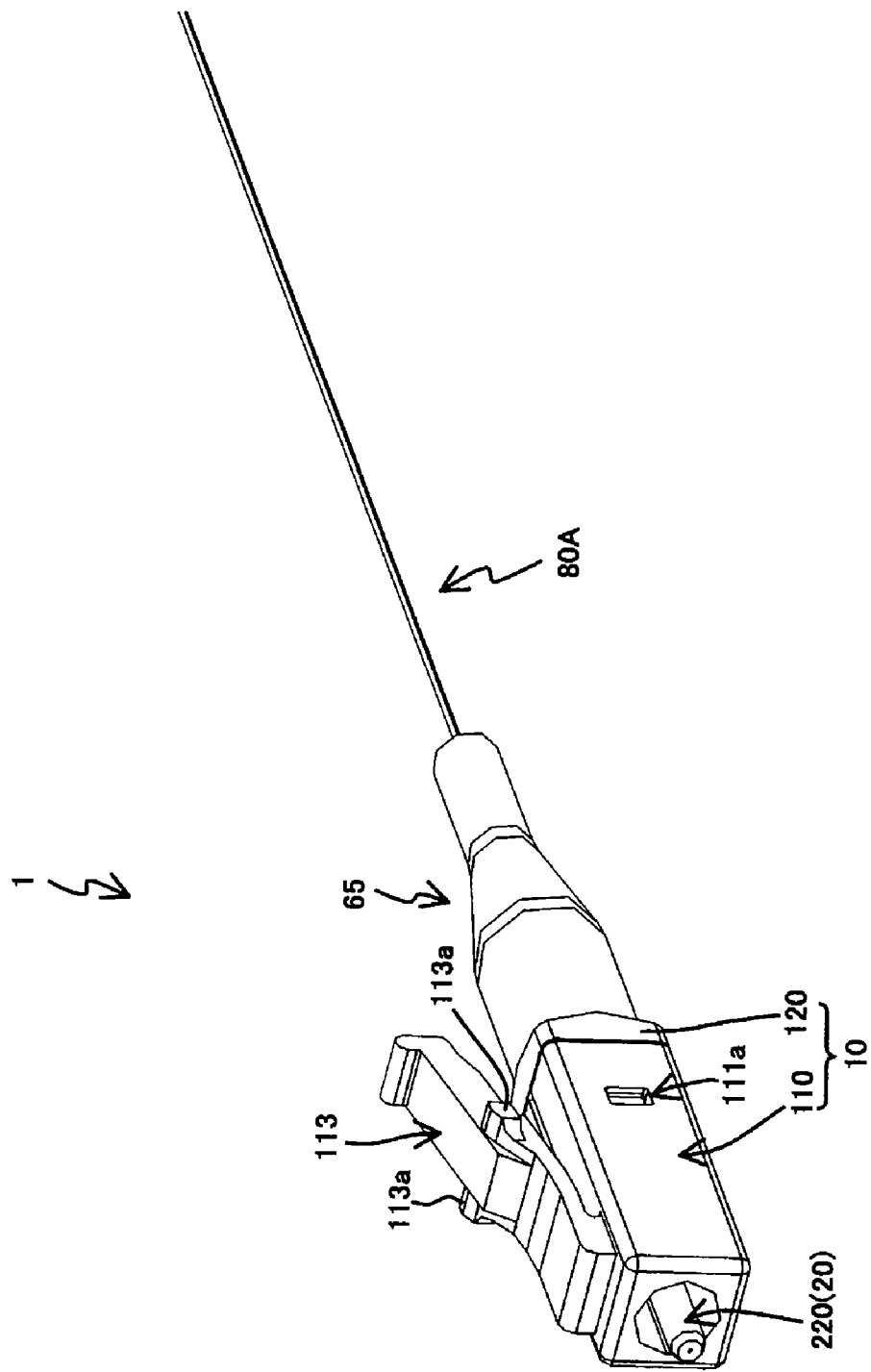
FIG. 1 is a perspective view of an optical fiber connector according to one embodiment of the present invention.
Figure 2:
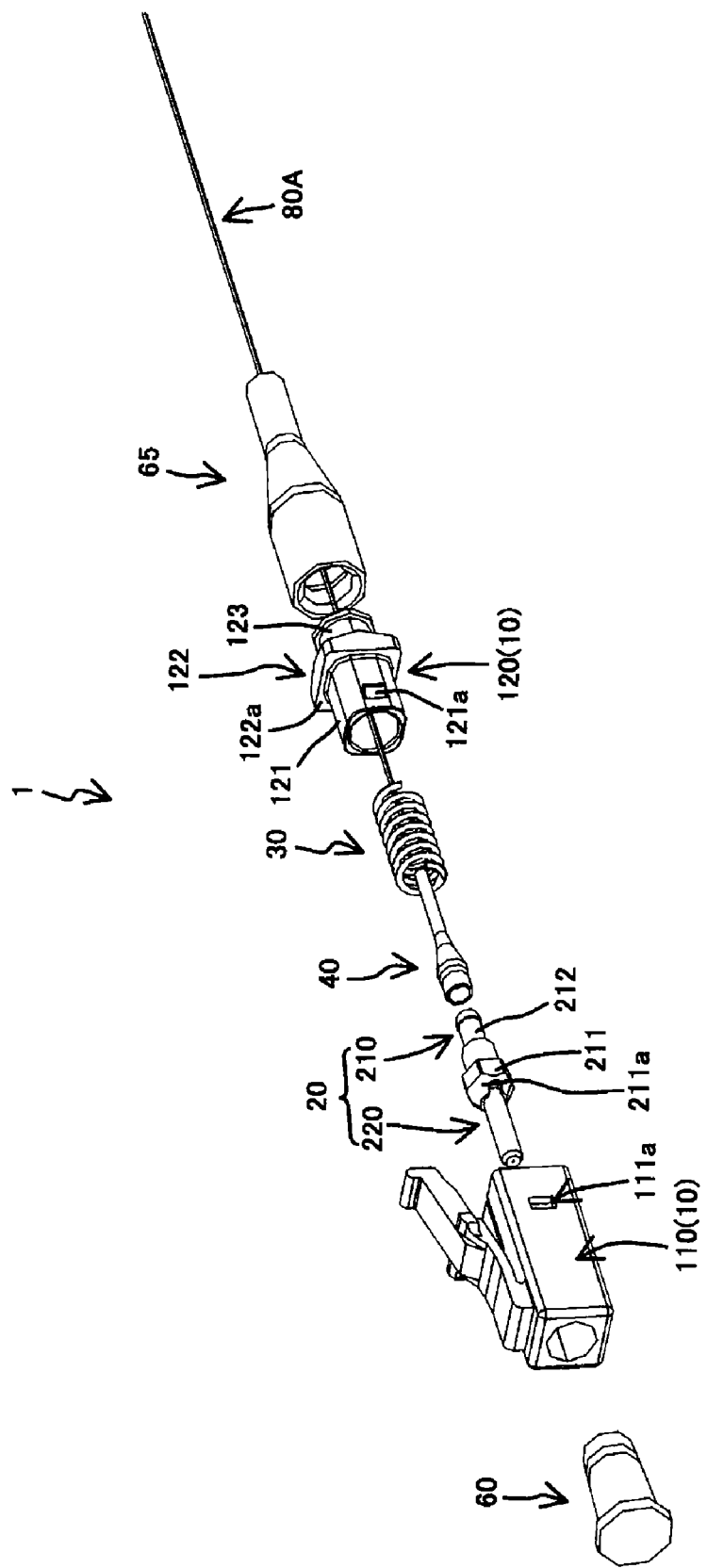
FIG. 2 is an exploded perspective view of the optical fiber connector shown in FIG. 1.

FIGS. 1 and 2 are respectively a perspective view and an exploded perspective view of an optical fiber connector 1 according to the present embodiment.

Figure 3:
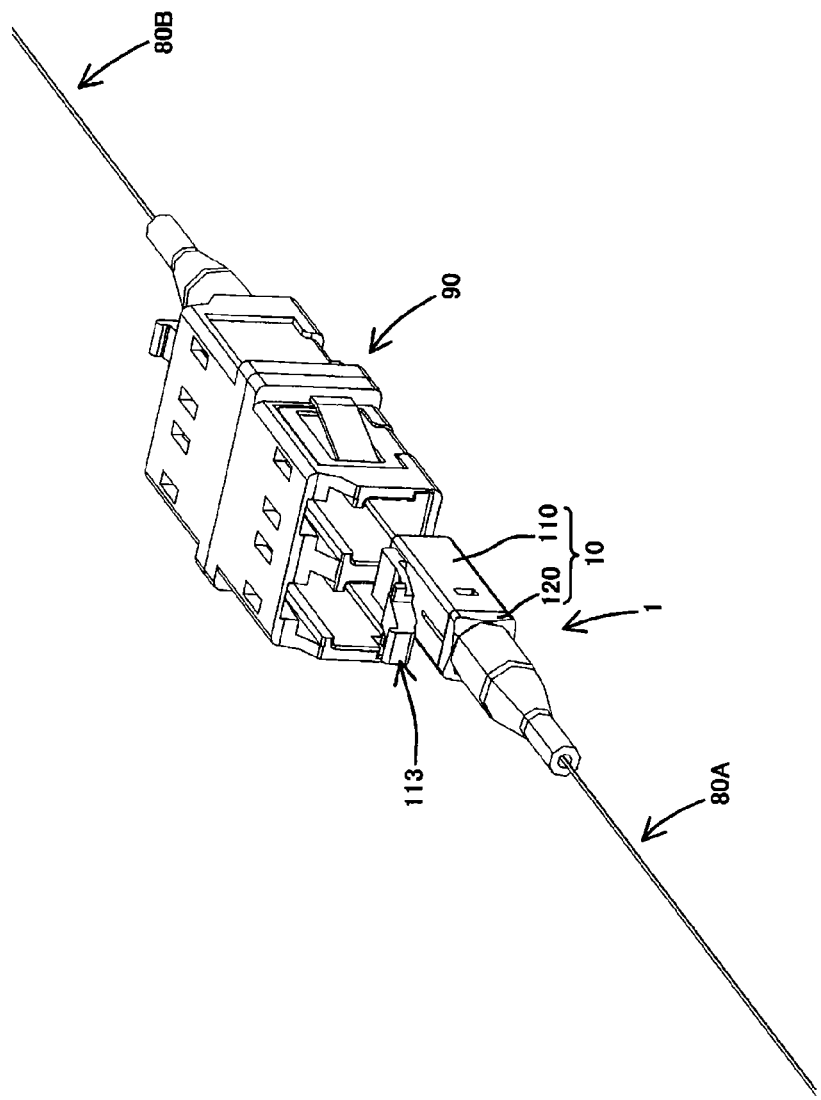
FIG. 3 is a perspective view of an example of an adapter to which the optical fiber connector shown in FIGS. 1 and 2 is detachably coupled.

FIG. 3 is a perspective view of an example of an adapter 90 to which the optical fiber connector 1 is detachably coupled.

Figure 4:
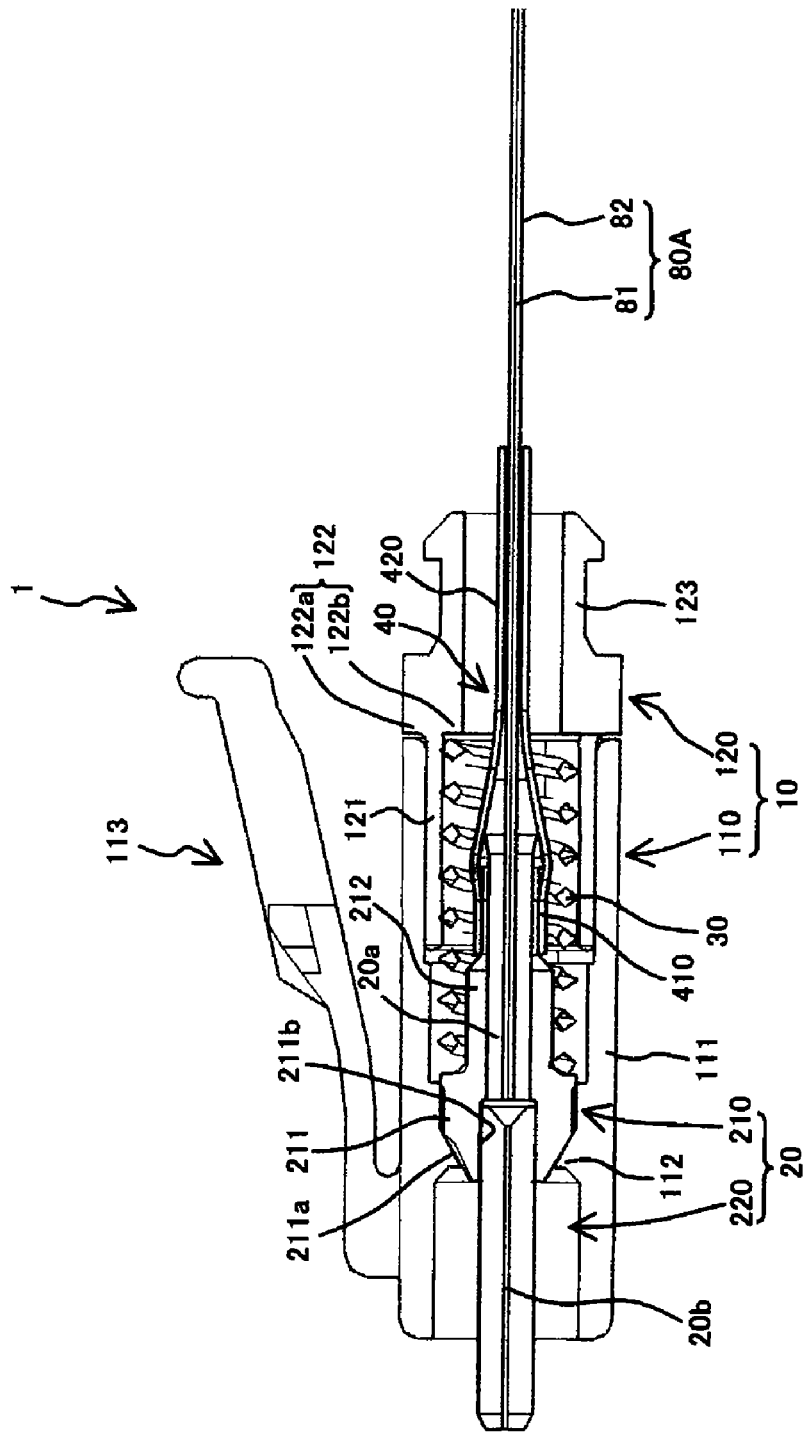
FIG. 4 is a vertical cross-sectional view of the optical fiber connector shown in FIGS. 1 and 2.

Further, FIG. 4 is a vertical cross-sectional view of the optical fiber connector 1.

As shown in FIG. 3, the optical fiber connector 1 is attached to a first optical fiber 80A so that the first optical fiber 80A is optically connected to a second optical fiber 80B by way of the adapter 90.

More specifically, as shown in FIG. 4, the optical fiber 80A includes a fiber wire 81 and a jacket 82 that surrounds the fiber wire 81, and has on a distal end side thereof a cladding part (not shown) where the fiber wire 81 is exposed.

The optical fiber connector 1 is attached to the distal end side of the optical fiber 80A.

More specifically, as shown in FIGS. 1, 2, and 4, the optical fiber connector 1 includes a housing 10, a ferrule 20 that is accommodated in the housing 10 in a movable manner along an axial line direction, and a bias member 30 that biases the ferrule 20 toward the distal end side of the optical fiber 80A.

The housing 10 is detachably coupled to the adapter 90 while accommodating the ferrule 20 and the bias member 30.

More precisely, as shown in FIGS. 1, 2, and 4, the housing 10 is provided with a hollow housing main body 110 and a hollow cap body 120 that is detachably coupled to the housing main body 110.

As shown in FIG. 4, the housing main body 110 has a hollow main body part 111, a flange part 112 that is provided in an axially intermediate portion on an inner peripheral surface of the main body part 111, and a lever part 113 that is provided on an outer peripheral surface of the main body part 111.

As shown in FIGS. 1 and 2, the main body part 111 has a pair of engaging concave parts 111a on an outer peripheral surface different from that provided with the lever part 113.

As shown in FIG. 4, the flange part 112 has an inclined surface to form a tapered opening that has a diameter becoming smaller as it goes toward the distal end side of the connector. The inclined surface functions as a seat surface on which the ferrule 20, which is biased toward the distal end side by the bias member 30, is seated.

The lever part 113 is elastically deformable so as to come close to and go away from the outer peripheral surface of the main body part 111.

As shown in FIG. 1, the lever part 113 is provided with a pair of engaging projections 113a. The pair of engaging projections 113a are engaged with a pair of engaging concave parts (not shown) that are provided to the adapter 90.

As shown in FIGS. 2 and 4, the cap body 120 has a distal-end-side cylindrical part 121 that is inserted into the main body part 111 of the housing main body 110, a flange part 122 inclusive of an outward flange 122a and an inward flange 122b that are extended radially outwards and inwards respectively from a proximal edge of the distal-end-side cylindrical part 121, and a proximal-end-side cylindrical part 123 that is positioned on a proximal end than the flange part 122.

As shown in FIG. 2, the distal-end-side cylindrical part 121 has an outer peripheral surface provided with a pair of engaging convex parts 121a that are engaged with the pair of engaging concave parts 111a provided to the main body part 111.

The pair of engaging convex parts 121a and the pair of engaging concave parts 111a are engaged with each other upon insertion of the distal-end-side cylindrical part 121 of the cap body 120 into the main body part 111 of the housing main body 110 such that a distal end surface of the outward flange 122a of the cap body 120 is brought into contact with a proximal end surface of the main body part 111 of the housing main body 110.

As shown in FIGS. 1 and 4, the ferrule 20 is accommodated in the housing 10 in a movable manner along the axis line direction and has a distal end extended outwards from the housing.

The ferrule 20 is provided on a proximal end thereof with a first axial hole 20a that has a first inner diameter larger than the outer diameter of the jacket 82, and also is provided on the distal end thereof with a second axial hole 20b that is communicated to a distal end of the first axial hole 20a and has a second inner diameter smaller than the first inner diameter and larger than the outer diameter of the fiber wire 81.

In the present embodiment, as shown in FIGS. 2 and 4, the ferrule 20 has a proximal-end-side member 210 that is provided with the first axial hole 20a, and a distal-end-side member 220 that is provided with the second axial hole 20b.

As shown in FIGS. 2 and 4, the proximal-end-side member 210 has a large-diameter part 211 that is located on the distal end side, and a small-diameter part 212 that is extended from the large-diameter part 211 toward the proximal end side with a step part being provided therebetween.

The large-diameter part 211 is provided on a distal end surface thereof with a tapered surface 211a that is seated onto the inclined surface, and a fitting hole 211b that is located radially inward of the tapered surface 211a.

As shown in FIG. 4, the distal-end-side member 220 is fixed to the proximal-end-side member 210 in a state of being fitted into the fitting hole 211b.

The proximal-end-side member 210 may be made of stainless steel, and the distal-end-side member 220 may be made of zirconia.

The bias member 30 presses the ferrule 20 toward the distal end so that the tapered surface 211a is brought into contact with the inclined surface.

In the present embodiment, the bias member 30 is embodied as a coil spring.

More specifically, as shown in FIG. 4, the bias member 30 has a proximal end which is engaged with a distal end surface of the inward flange 122b of the cap body 120, and a distal end which is engaged with a proximal end surface of the large-diameter part 211 of the ferrule 20, so that the bias member 30 presses the ferrule 20 toward the distal end side.

Further illustrated in FIG. 2 is a cap 60 that is detachably attached to the housing 10 so as to surround an outwardly extended part of the ferrule 20 upon detachment of the optical fiber connector 1 from the adapter 90.

FIGS. 1 and 2 also show a boot 65 that inserts around the proximal-end-side cylindrical part 123 of the cap body 120 of the housing 10.

As shown in FIGS. 2 and 4, the optical fiber connector 1 according to the present embodiment also includes a flexible tube 40 in addition to the components already described.

Figure 5:
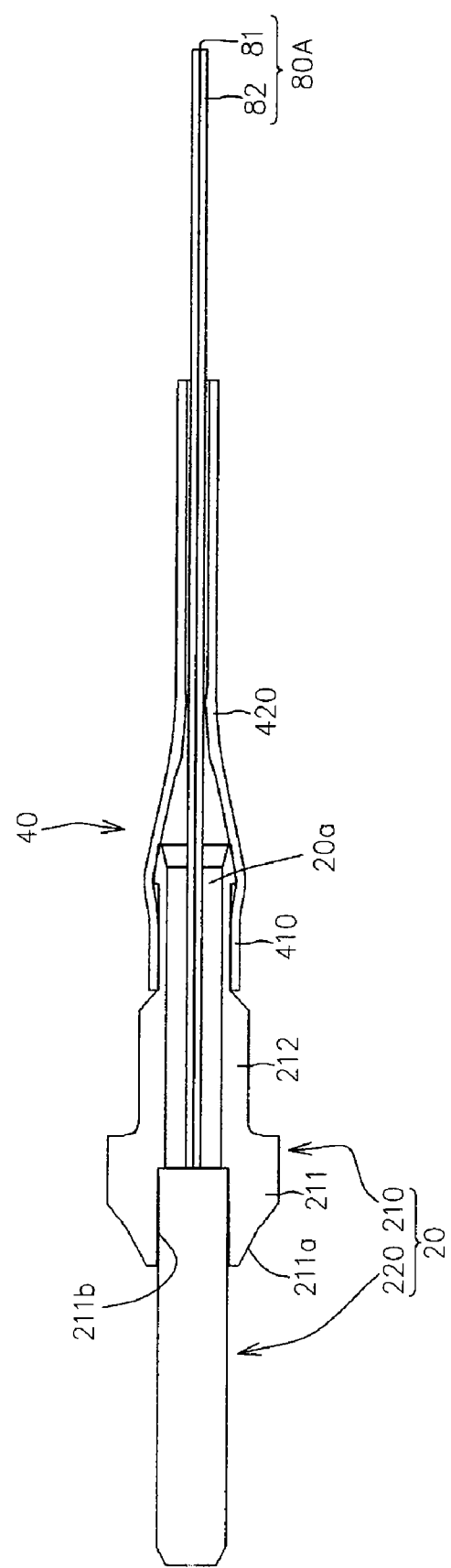
FIG. 5 is a partial cross-sectional view of a ferrule and a flexible tube of the optical fiber connector.

FIG. 5 is a partial cross-sectional view of the ferrule 20 and the flexible tube 40.

As shown in FIGS. 4 and 5, the flexible tube 40 is inserted around the proximal end side of the ferrule 20 such that at least a part of the flexible tube 40 is extended toward the proximal end side beyond the ferrule 20.

More specifically, the flexible tube 40 has a distal-end-side outer part 410 that inserts around the proximal end side of the ferrule 20, and a proximal-end-side extended part 420 that is located on the proximal end side of the connector from the ferrule 20.

The proximal-end-side extended part 420 has an inner diameter which is larger than the outer diameter of the jacket 82 and is smaller than the first inner diameter of the first axial hole 20a.

The optical fiber connector 1 is fixed to the optical fiber 80A with use of an adhesive agent (not shown) which is filled in the first axial hole 20a as well as in the proximal-end-side extended part 420, while the fiber wire 81 of the cladding part is inserted into the second axial hole 20b and a region (hereinafter, referred to as a fixed region) adjacent to the proximal end of the cladding part in a portion of the fiber wire 81 being wrapped with the jacket 82 is inserted into the first axial hole 20a and the proximal-end-side extended part 420.

The optical fiber connector 1 thus configured makes it possible to facilitate insertion of the fiber wire 81 of the cladding part into the second axial hole 20b in the ferrule 20, and also to facilitate workability in filing of the adhesive agent when fixing the optical fiber 80A to the ferrule 20 with use of the adhesive agent while preventing displacement of the optical fiber 80A with respect to the ferrule 20.

More specifically, the first axial hole 20a functions as a guide for insertion of the cladding part into the second axial hole 20b, and also functions as an adhesive-agent filled region that receives the adhesive agent with the fixed region being inserted therein.

For example, in a case where the inner diameter of the first axial hole 20a is set as approximately equal as possible to the outer diameter of the jacket 82 while allowing the fixed region to be inserted into the first axial hole 20a, the first axial hole 20a can effectively function as the guide, thereby resulting in facilitated insertion of the fiber wire 81 of the cladding part into the second axial hole 20b.

However, in the case where the inner diameter of the first axial hole 20a is set as approximately equal as possible to the outer diameter of the jacket 82, it, on the other hand, becomes difficult to evenly fill the adhesive agent around the fixed region as well as to fill the adhesive agent into the distal end of the first axial hole 20a. Thus, in some cases, the optical fiber 80A and the ferrule 20 may not be solidly fixed with each other.

Contrary to the example, in a case where the inner diameter of the first axial hole 20a is made extremely larger than the outer diameter of the jacket 82, the adhesive agent can be easily filled in the first axial hole 20a. However, at the same time, decreased is the function of the first axial hole 20a as the guide.

Furthermore, if the inner diameter of the first axial hole 20a is made too large, the axial position of the fixed region may be displaced with respect to the axial position of the second axial hole 20b when the adhesive agent is being filled in or being solidified. When the fixed region is axially displaced, the boundary between the cladding part and the fixed region is applied with a stress in a direction different from the axial direction of the optical fiber 80A. Thus, in some cases, the fiber wire 81 may be deformed by such a stress.

In order to solve these problems, the optical fiber connector 1 according to the present embodiment includes, as already described, the flexible tube 40 that inserts around the proximal end side of the ferrule 20 and that is provided with the proximal-end-side extended part 420 having the inner diameter larger than the outer diameter of the jacket 82 and smaller than the first inner diameter of the first axial hole 20a.

In the above configuration, the flexible tube 40 functions as a guide for insertion of the fiber wire 81 of the cladding part into the second axial hole 20b. Accordingly, even in the case where the inner diameter of the first axial hole 20a is made extremely larger than the outer diameter of the jacket 82, the fiber wire 81 of the cladding part can be stably and easily inserted into the second axial hole 20b.

Provision of the flexible tube 40 further prevents displacement of the axial position of the optical fiber 80A with respect to the axial position of the ferrule 20, in a state where the fiber wire 81 of the cladding part is inserted into the second axial hole 20b and the fixed region is inserted into the first axial hole 20a. Therefore, when the adhesive agent is filled in via the flexible tube 40 and/or when the filled adhesive agent is solidified, effectively prevented is displacement of the axial position of the optical fiber 80A with respect to the axial position of the ferrule 20.

Moreover, flexibility of the flexible tube 40 allows the adhesive agent to be easily filled in the first axial hole 20a via the flexible tube 40 even in a case where the inner diameter of the proximal-end-side extended part 420 of the flexible tube 40 is set as approximately equal as possible to the outer diameter of the jacket 82. As a result, improved are workability as well as strength in adhesion between the optical fiber 80A and the ferrule 20.

The flexible tube 40 is preferably formed by a hollow member having thermal contractility.

The preferable configuration makes it possible to facilitate workability in inserting the flexible tube 40 around the ferrule 20 while easily making the inner diameter of the proximal-end-side extended part 420 smaller than the inner diameter of the first axial hole 20a.

The member having thermal contractility may be made of polyolefin, fluorine, silicon resin, or the like.

In the optical fiber connector 1 according to the present embodiment, an assembly inclusive of the housing 10, the ferrule 20 and the bias member 30 can be commonly employed to a plurality of optical fibers having the jackets 82 of outer diameters different from each other.

More precisely, a multicore connector such as an MPO is generally configured such that a small-diameter optical fiber with a jacket having an outer diameter of 0.25 mm could be coupled thereto.

On the other hand, a single-core connector such as an LC BTW is generally configured such that a large-diameter optical fiber with a jacket having an outer diameter of 0.9 mm could be coupled thereto.

As described above, there are large-diameter and small-diameter optical fibers with the jackets having different outer diameters.

In a case where the large-diameter optical fiber is employed, the first axial hole 20a in the ferrule 20 is preferably formed to have an inner diameter of approximately 1 mm.

Meanwhile, if the ferrule 20 with the first axial hole 20a having an inner diameter of 1 mm is applied to the small-diameter optical fiber, the first axial hole 20a cannot function as the guide.

Thus, in the case where the small-diameter optical fiber is employed, it is required to utilize an exclusive ferrule with the first axial hole 20a having an inner diameter of approximately 0.35 mm, or to have an additional hollow tube (not shown) with an outer diameter of 0.9 mm inserted around the small-diameter optical fiber, so that the small-diameter optical fiber could be stably fixed to the ferrule for the large-diameter optical fiber.

In the optical fiber connector 1 according to the present embodiment, as already described, there is provided the flexible tube 40 that is coupled to the proximal end side of the ferrule 20.

According to the optical fiber connector 1 thus configured, it is possible to commonly employ the ferrule 20, the housing 10 and the bias member 30 to both of the large-diameter and small-diameter optical fibers y arranging the inner diameter of the first axial hole 20a in the ferrule 20 to a diameter (such as 1 mm) suitable for the large-diameter optical fiber, and arranging the inner diameter of the proximal-end-side extended part 420 of the flexible tube 40 to a diameter (such as 0.35 mm) suitable for the small-diameter optical fiber.

More specifically, the optical fiber connector 1 can be attached to the small-diameter optical fiber with use of the flexible tube 40.

The optical fiber connector 1 can be also attached to the large-diameter optical fiber by removing the flexible tube 40 or by replacing the flexible tube 40 with another flexible tube that has the proximal-end-side extended part 420 of an inner diameter substantially identical to the inner diameter of the first axial hole 20a.

More preferably, as shown in FIG. 4, the proximal-end-side extended part 420 of the flexible tube 40 has an end which is located away from the ferrule 20 and is extended outwards from the housing 10.

The preferable configuration makes it possible to effectively prevent the optical fiber 80A from being directly brought into contact with the rigid housing 10, thereby preventing deformation and the like of the optical fiber 80A.

This specification is by no means intended to restrict the present invention to the preferred embodiment and the modified embodiment set forth therein. Various modifications to the optical fiber connector may be made by those skilled in the art without departing from the spirit and scope of the present invention as defined in the appended claims.

What is claimed is:

1. An optical fiber connector attached to a distal end side of an optical fiber that includes a fiber wire and a jacket surrounding the fiber wire and that has on the distal end side a cladding part where the fiber wire is exposed, the optical fiber connector comprising, a housing detachably coupled to an adaptor, a rigid ferrule accommodated in the housing in a movable manner along an axis line direction, the ferrule having a distal end extended outwards from the housing, the ferrule having a proximal end side with a first axial hole that has a first inner diameter larger than an outer diameter of the jacket and a distal end side with a second axial hole that is communicated to a distal end of the first axial hole and that has a second inner diameter smaller than the first inner diameter and larger than an outer diameter of the fiber wire, a bias member that biases the ferrule toward the distal end side of the optical fiber within the housing, and a flexible tube inserted around the proximal end side of the ferrule so that at least a part thereof is extended toward the proximal end side from the ferrule to form a proximal-end-side extended part, wherein the proximal-end-side extended part of the flexible tube has an inner diameter that is larger than the outer diameter of the jacket and that is smaller than the first inner diameter.

2. An optical fiber connector according to claim 1, wherein the flexible tube is formed by a hollow member having thermal contractility.

3. An optical fiber connector according to claim 1, wherein
the first inner diameter is set to a diameter that allows an optical fiber having an outer diameter of 0.9 mm to be inserted therein, and
the proximal-end-side extended part of the flexible tube has an inner diameter that prevents the optical fiber having an outer diameter of 0.9 mm from being inserted therein while allowing an optical fiber having an outer diameter of 0.25 mm to be inserted therein.

4. An optical fiber connector according to claim 1, wherein the proximal-end-side extended part of the flexible tube has an end that is located away from the ferrule and that is extended outwards from the housing.

* * * * *